United States Patent
Munoz Delgado

(10) Patent No.: US 12,288,388 B2
(45) Date of Patent: Apr. 29, 2025

(54) SYSTEM AND METHOD TO ALTER AN IMAGE

(71) Applicant: Robert Bosch GmbH, Stuttgart (DE)

(72) Inventor: Andres Mauricio Munoz Delgado, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 993 days.

(21) Appl. No.: 17/345,603

(22) Filed: Jun. 11, 2021

(65) Prior Publication Data

US 2022/0004824 A1    Jan. 6, 2022

(30) Foreign Application Priority Data

Jul. 2, 2020    (EP) ..................................... 20183757

(51) Int. Cl.
| | |
|---|---|
| *G06N 3/08* | (2023.01) |
| *G06F 18/211* | (2023.01) |
| *G06F 18/22* | (2023.01) |
| *G06F 18/241* | (2023.01) |
| *G06N 3/094* | (2023.01) |
| *G06V 10/764* | (2022.01) |
| *G06V 10/77* | (2022.01) |
| *G06V 10/776* | (2022.01) |
| *G06V 10/82* | (2022.01) |

(52) U.S. Cl.
CPC ............ *G06V 10/82* (2022.01); *G06F 18/211* (2023.01); *G06F 18/22* (2023.01); *G06F 18/241* (2023.01); *G06N 3/08* (2013.01); *G06N 3/094* (2023.01); *G06V 10/764* (2022.01); *G06V 10/7715* (2022.01); *G06V 10/776* (2022.01)

(58) Field of Classification Search
CPC ......... G06N 3/094; G06V 10/82; G06F 18/22
See application file for complete search history.

(56) References Cited

U.S. PATENT DOCUMENTS

| | | | |
|---|---|---|---|
| 2017/0316281 A1 | 11/2017 | Criminisi et al. | |
| 2020/0058113 A1* | 2/2020 | Nam | G06T 7/33 |
| 2020/0219274 A1* | 7/2020 | Afridi | G06N 20/00 |

(Continued)

FOREIGN PATENT DOCUMENTS

| | | | | |
|---|---|---|---|---|
| CN | 115210750 A | * | 10/2022 | ........... G06T 7/0012 |
| ES | 1258130 U | * | 10/2020 | ............... G06K 9/03 |

OTHER PUBLICATIONS

Shrikumar, Avanti, Peyton Greenside, and Anshul Kundaje. "Learning important features through propagating activation differences." International conference on machine learning. PMIR, 2017. (Year: 2017).*

(Continued)

*Primary Examiner* — Hal Schnee
(74) *Attorney, Agent, or Firm* — NORTON ROSE FULBRIGHT US LLP

(57) ABSTRACT

Alteration of an input image to provide an interpretability of a trained classifier. The altered image may be determined by optimizing at least: a classification score of the altered image to reduce a distance between a classification of the altered image and a target classification, and a similarity score to reduce a distance between an average filter activation difference and a measure for a difference in filter activations between the input image and the altered image.

16 Claims, 6 Drawing Sheets

(56) References Cited

U.S. PATENT DOCUMENTS

| | | | |
|---|---|---|---|
| 2021/0248409 A1* | 8/2021 | Iyer | G06N 3/045 |
| 2021/0279841 A1* | 9/2021 | Liu | G06T 3/4046 |
| 2021/0357644 A1* | 11/2021 | Jain | G06V 10/764 |
| 2021/0382936 A1* | 12/2021 | Tomar | G06N 20/00 |

OTHER PUBLICATIONS

Liu, Juhua, et al. "Multistage GAN for fabric defect detection." IEEE Transactions on Image Processing 29 (2019): 3388-3400. (Year: 2019).*

Piccoli, Flavio. "Visual Anomaly Detection For Automatic Quality Control." (2019). (Year: 2019).*

Fong et al., "Interpretable Explanations of Black Boxes by Meaningful Perturbation," Cornell University, 2018, pp. 1-9.<https://arxiv.org/pdf/1704.03296.pdf> Downloaded Jun. 10, 2021.

Chang et al., "Explaining Image Classifiers by Counterfactual Generation," Cornell University, 2019, pp. 1-19. <https://arxiv.org/pdf/1807.08024.pdf> Downloaded Jun. 10, 2021.

\* cited by examiner

A

B

C

SYSTEM AND METHOD TO ALTER AN IMAGE

CROSS REFERENCE

The present application claims the benefit under 35 U.S.C. § 119 of European Patent Application No. EP 20183757.2 filed on Jul. 2, 2020, which is expressly incorporated herein by reference in its entirety.

FIELD

The present invention relates to a method of altering an input image, an image processing system for altering an input image, and a transitory or non-transitory computer readable medium.

BACKGROUND INFORMATION

Explainability is a core element of both model verification (did we build the model right?) and validation (did we build the right model?). Large, state-of-the-art neural network models can be tricked into providing false, high confidence predictions; their true generalization performance has therefore been called into question. As with any other software component intended for deployment in the field, it is important to quantitatively establish the degree to which these models can be verified and validated. As neural network based algorithms applied to important tasks in the field, it is important that the degree to which a model has learned the desired input-to-output relationship can be analyzed; for example, trained neural networks have been applied in fields, such as medical diagnosis or autonomous driving. The inventors have found that exploitability is also a particular pressing problem when designing neural networks for manufacturing.

For example, without the ability to analyze a trained neural network, one may, e.g., inadvertently use a limited, and thus inherently biased, dataset and produce models that are over-parametrized in comparison to the amount of data available. This may produce a wide gap between what a model has actually learned and what the implementer thinks the model has learned. As deep neural networks are increasingly applied in critical tasks, tools are needed which a neural network engineer may use to probe this gap.

While several techniques exist that claim to perform attribution of a model's predictions to its inputs certainly exist in the related art, they suffer from various disadvantages.

For example, saliency methods can be characterized by their output histogram or heatmaps which mark the attention distribution. e.g., on input pixels. Such explanations suffer from several limitations in its expressivity. For example, it cannot adequately express a classification explanation that is attributed to changes in the global illumination of the input image, or to negative information in input, e.g., the fact that some discriminatory feature is missing from the input instance. These scenarios, which often occur in, e.g., manufacturing use cases, are often not fit to be analyzed using the aforementioned method.

Another approach is the generation of so-called counterfactuals. A counterfactual is a sample which is similar to other samples of a known class, but is classified differently by the underlying model. Similar to other samples of a known class may mean drawn, or appear to be drawn, from the same distribution. Producing counterfactuals is a tool to understand the highly nonlinear decision boundary learned by a model and thus to explain classifier decisions.

For example, counterfactuals are addressed in the paper "Interpretable explanations of black boxes by meaningful perturbation.", by Ruth C. Fong and Andrea Vedaldi, incorporated herein by reference. This paper describes an optimization approach working directly on the pixel level of an input image. An important drawback of this approach is that produced counterfactuals are typically adversarial, e.g., fall outside the space of natural images that underlying model was trained on. The result are images that are artificial, and produce a different classification for reasons that are not likely to occur in practice.

Another approach to explainability is described in the paper "Explaining image classifiers by counterfactual generation.", by Chun-Hao Chang, et al., incorporated herein by reference. This approach uses generative models to produce natural-looking counterfactuals. Unfortunately, this comes at the price of having to train a generative model, which for many applications, e.g., those for which only few data points are available, is not possible or practical.

SUMMARY

It would be advantageous to have an improved way to analyze the behavior of a trained classifier. The trained classifier is computer-implemented and is configured to receive an image as input, and to produce a classification. The trained classifier comprises multiple trained filters—typically the trained classifier is a convolutional neural network, e.g., a neural network that comprises multiple convolutional filters, typically, multiple layers comprising multiple convolutional filters.

As also pointed out in the background, it may be important to verify the classification boundary, e.g., the boundary between inputs that are classified differently, when such trained classifiers are applied in the field. However, conventional methods to analyze neural networks have limitations. For example, they may only provide explainability in the form of histograms or heat-maps that say little about the classification boundary. For example, they may produce counterfactuals that are either adversarial, or require the training of new neural networks. Adversarial counterfactuals have only little relevancy for real-world applications, e.g., because adversarial scenarios occur only rarely.

Example embodiments of the present invention address these and other drawbacks. For example, in an example embodiment of the present invention, non-adversarial counterfactuals are produced without requiring the training of a new network, e.g., without relying on generative modelling. Example embodiments of the present invention provide a powerful new tool to debug or validate trained classifiers.

For example, in an example embodiment of the present invention, an input image is altered by optimizing an altered image for a classification score, so that the altered image would be classified different from the input image. For example, while the trained classifier may classify the input image as a source classification, the trained classifier may classify the altered image as a target classification, different from the source classification. Interestingly, the optimization also tries to optimize a similarity score. The similarity score ensures that the way the altered image causes different activations in the classifier's filters is similar to the way a typical image from the target classification causes different activations in the classifier's filters compared to a typical image of the source classification.

For example, optimizing the similarity score reduces a distance between, on the one hand, a measure for a difference in filter activations of a first set of images having the source classification and a second set of images having a target classification, and on the other hand, a measure for a difference in filter activations between the input image and the altered image.

Different measures are possible for characterizing the filter activation. Although direct comparison of filter activations, or of average filter activations is possible, advantageously filter activation is summarized in a relevant manner.

Preferably, the measure used for filter activation comparison is translation-independent, e.g., the measure should not change if the input is slightly offset. Direct comparison of filter activations is not translation independent. For example, a particular good choice for this measure are second order statistics; e.g., as summarized in a Gram matrix, also known as the Gramian matrix; A Gram matrix is translation independent.

Using the Gram matrix has additional advantages, as it is typically quite robust to differences in global brightness, even object rotations. A good way to think of the Gram matrix is as a way to summarize local and global textures, which, when put together, result in the distinct style of an in image. The fact that it is such a general summary statistic makes it an excellent candidate for embodiments.

Altered images produced by an example embodiment of the present invention provide explainability, since they show what the image should like in order to provide a different classification. For example, for a source classification that would lead to discarding the corresponding object, the altered image, explains what the image should have looked like in order to keep it.

In contrast to conventional approaches, the counterfactual generation process may be viewed as a transformation process that is informed by general concepts found in a body of examples, e.g., a first set of images and a second set of images. In particular, a quantified measure such as a Gramm matrix of filter activations, or of filter activations differences, may be used to summarize a style. This measure may be used to build a distance metric that is minimized in an optimization procedure.

As pointed out, the transformation process may be implemented using an optimization procedure that undertakes this style transformation while forcing the output class membership to change. Optionally, uncertainty estimation techniques are used as a further reinforcement to create high confidence counterfactuals. The latter further improves the naturalness of the images, thus making the generated counterfactuals even more relevant for real-life. This is important for probing or correcting the classification boundary—real examples, or almost real examples, of incorrect classification are much more important for applications than unnatural ones. Including uncertainty estimation in the optimization also decreases the likelihood of adversarial solutions.

Interestingly, example embodiments of the present invention do not require expensive generative modelling. Not needing a new neural network is also an advantage for use cases where, e.g., limited data is available. Moreover, adversarial counterfactuals are avoided. Avoiding the need of a new neural network also speeds up the counterfactual generation process, which is an advantage, e.g., when one needs to process many samples, or need to process them quickly.

Interestingly, the counterfactual generation process is informed using sets of examples. These example sets may conform to the classification, e.g., be randomly selected from a set of images having the desired classification. However, such a set of examples also provides additional flexibility of adding the concept expressed in any such example set; thus interpreting images from this perspective. Testing with arbitrary concepts allows one to more fully explore the explanation space around any given data sample. Applying embodiments with different first and second sets also ensures that the outcome does tend to converge to the same sample.

In an example embodiment of the present invention, the first set and/or the second set comprises a single image. Using only a single image in the first and/or second set, is possible but has the disadvantage, that the optimization is informed also by the particular peculiarities of the single image. In an embodiment, the first set, the second set, or both the first and second set comprise multiple images, e.g., at least 2, at least 10, etc. Using multiple images allows the operator, e.g., to define the type defect he/she is interested in, by selecting multiple images that have that type of defect.

For example, a trained classifier may be trained for a binary classification, e.g., OK and NOK (not OK) classes. This classification can be used to construct example sets, and to generate counterfactuals. However, one may also obtain, e.g., curate, sets of example images that express finer classes, e.g., particular failure modes, e.g., missing components, scratched components, etc., or particular OK modes, e.g., with correct lighting, with slightly overexposed or underexposed lighting, etc. These sets may be used to generate examples where the neural network fails with particular fine control; thus exploring the classification boundary with more control.

Interestingly, example embodiments of the present invention can quickly generate many counterfactual images. When the generated counterfactuals are reviewed, e.g., by a human operator, many of them may be correct, in the sense that they look natural, and that their new classification is correct. On the other hand, many of the generated counterfactual images may not correctly correspond to their new classification. It was found that using an embodiment, one can easily generate counterfactual images that look natural but that are incorrectly classified. By including such counterfactuals in a training or a retraining of the classifier, the classification boundary can be actively corrected.

Counterfactuals produced by an example embodiment of the present invention give an important visual understanding of where a classifier draws its classification boundary. Further training of the classifier based on whether these counterfactuals are appropriate or not is possible to improve the classifier. For example, one may label the produced counterfactuals and use them to fine tune the model, e.g., retrain the model. A targeted correction of the classification boundary becomes possible.

Methods of generating an altered image according to an example embodiment of the present invention may be computer implemented. Devices and/or systems for generating an altered image are electronic devices, e.g., a computer configured for a method according to an example embodiment of the present invention.

The methods of altering an image as described herein may be applied in a wide range of practical applications. Such practical applications include: testing and debugging of trained classifiers, in particular neural networks, in particular convolutional neural networks; and correcting classification boundaries of trained classifiers. Trained classifiers are used in many applications, for example: medical applications, e.g., classifying organs in a medical image, classifying objects in the vicinity of an autonomous vehicle, classifying objects near or manipulated by a robot, classifying manufactured objects, e.g., OK/NOK classification.

An example embodiment of the method according to the present invention may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an example embodiment of the present invention, the computer program comprises computer program code adapted to perform all or part of the steps of an embodiment of the method when the computer program is run on a computer. Preferably, the computer program is embodied on a computer readable medium.

BRIEF DESCRIPTION OF THE DRAWINGS

Further details, aspects, and embodiments will be described, by way of example only, with reference to the figures. Elements in the figures are illustrated for simplicity and clarity and have not necessarily been drawn to scale. In the figures, elements which correspond to elements already described may have the same reference numerals.

LIST OF REFERENCE NUMERALS IN FIGS. 1-2, 5a, 5b

Figure 1A:
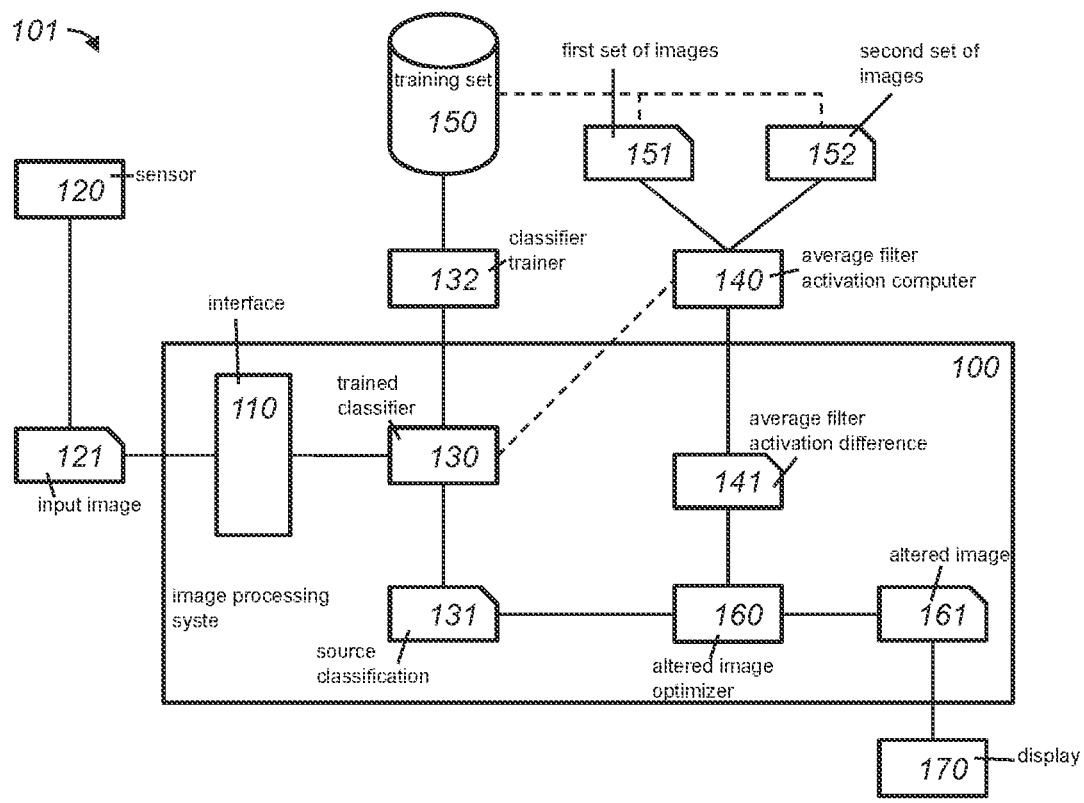
FIG. 1a schematically shows an example of an embodiment of an image processing system, in accordance with the present invention.

The following list of references and abbreviations is provided for facilitating the interpretation of the figures and shall not be construed as limiting the scope of the present invention.

100 image processing system
101 extended image processing system
110 an interface
120 a sensor
121 an input image
130 a trained classifier
131 a source classification
132 a classifier trainer
140 an average filter activation computer
141 an average filter activation difference
150 a training set
151 a first set of images
152 a second set of images
160 an altered image optimizer
161 an altered image
170 a display
181 a first manufacturing station
182 a second manufacturing station
190 a circuit board
191-193 a component
200 an image processing flowchart
201 extended image processing flowchart
221 an input image
222 a filter activation difference
230 a trained classifier
232 a filter selection
241 an average filter activation difference
251 a first set of images
252 a second set of images
253 first average filter activation
254 second average filter activation
261 an altered image
262 optimized image
263 a similarity score
264 an uncertainty estimation
265 a classification score
266 a classification threshold
267 a total loss value
268 an optimization loop
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF EXAMPLE EMBODIMENTS

While the presently disclosed subject matter is susceptible of embodiment in many different forms, there are shown in the figures and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein.

FIG. 1a schematically shows an example of an embodiment of an image processing system 100. In this example, image processing system 100 is shown as an image processing device 100. However, the image processing system may be implemented in a distributed manner; for example, processing, storage, input and/or output of the image processing system may be implemented in the cloud. Image processing system 100 is configured with an interface 110. Interface 110 is configured to receive an input image 121 as input. The interface 110 may also be configured to receive a trained image classifier. Image processing system 100 is configured to generate an altered image 161 from input image 121, e.g., a counterfactual. The altered image is obtained through an optimization sequence, so that the altered image has a different classification, e.g., the target classification. Moreover, the filter activation caused by altered image 161 may differ from the filter activations of the input image 121 in a similar manner as a typical image having the source classification differs from a typical image having the target classification. A typical image of the source classification may be represented by a first set of images 151—also referred to as $C_x$; a typical image of the target classification may be represented by a second set of images 152—also referred to as $C_y$.

Image processing system 100 may be connected to or comprise a display 170 for displaying the altered image 161. The original image 121 may be also displayed. One may also or instead display the differences between altered image 161 and original image 121. Especially in optical inspection use cases, most images are very similar; and in particular altered image 161 and original image 121 are often quite similar, so that the difference image often gives a good indication where the relevant part of image 121 is located that was relevant for the decision of classifier 130. This further contributes to explainability.

Figure 1B:
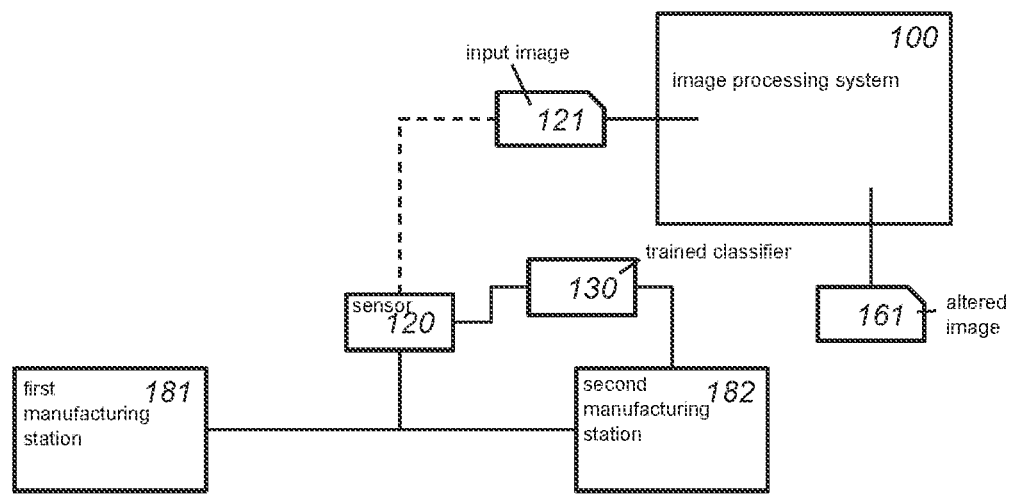
FIG. 1b schematically shows an example of an embodiment of a manufacturing line, in accordance with the present invention.

FIG. 1b schematically shows an example of an embodiment of a manufacturing line, in which the trained classifier may be used. For example, the trained classifier may be used for optical inspection. For example, the manufacturing line may be configured to manufacture a circuit board, e.g., a PCB board. For example, the circuit board may be an electronic control unit (ECU), e.g., an embedded system in automotive electronics that controls one or more of the electrical systems or subsystems in a vehicle. For example, the manufacturing line may be configured to manufacture welding metal plates, e.g., for use in automotive manufacturing. Schematically shown in FIG. 1b is a first manufacturing station 181, which may be thought to generate said physical object, e.g., circuit board, welded metal plates, etc.

As part of the manufacturing line an image sensor 120 is configured to obtain an image of the manufacture object; the object may be a finished or partially finished object. For example, in case of the circuit board example, the image may be an image in the visible spectrum. For example, in case of the metal-plates, the image may be an image in the X-ray spectrum. The particular spectrum in which the image is obtained depends on the spectrum where likely defects are visible.

A trained classifier 130 is configured to classify the image obtained by sensor 120. A typical example is that the trained classifier 130 is configured for the classes OK and NOK (not OK). Based on the classification a second manufacturing station 182 which is to operate on the object produced by the first manufacturing station 181 may perform a different action. Typically, the object is discarded in f for a NOK classification, while for an OK classification the object may be further processed. For example, station 181 and 182 may both be machines; for example, station 181 and 182 may both be humans; for example, station 181 may be a machine and station 182 may be a human.

For example, in case of the circuit board typical defects include a scratch and a missing component. For example, in case of the welded metal plates, a typical defect are air bubbles trapped in the welded connection. Classifier 130 may be a binary classifier, but the classifier may be configured with further classes. For example, classifier 130 may have an OK class, a scratched class, a missing components class, etc. Even smaller grained classifications are possible—e.g., a scratch at a particular component, a particular missing component, and so on. The same holds for the metal plates example.

The first and second set of examples may correspond to these classifications, even if the classifier is not configured to output such classes. For example, the first set may correspond to OK classified images, while the second set may be scratched images—even if the classifier is a binary classifier. The images in the first and second set may still conform to the source and target classification respectively, but they may not be drawn randomly from said classes. Instead, the first and second set may be used to steer the generation of counterfactuals in a particular direction.

Wrong classifications of model 130 can cause various problems. For example, classifier 130 may classify an object as NOK even though it should be classified as OK, which may cause the object to be wrongly discarded. It is even worse if classifier 130 classifies an object as OK even though it should be classified as NOK. This will likely waste valuable time in the follow-up processing, especially if the follow processing involves a human operator, then this should ideally be avoided as human involvement is costly. Worst case, a wrong classification would result in a bad part included in a finished product, e.g., a bad circuit board in an ECU of a car. Repairing such problems is much more involved in a finished product than directly after manufacture by station 181.

An image classifier such as classifier 130 may be trained using supervised learning. For example, a database 150 of images may be collected that have a known classification. Known training methods may be used to train the classifier. For example, an efficient way to obtain a trained image classifier, is to pre-train the classifier on a large image set, e.g., the ImageNet collection. The pre-trained network may then be retrained on the images relevant for sensor 120 in FIG. 1b. Various conventional ways to obtain a trained image classifier 130 may be used.

After training classifier 130, it will classify most images that come out of image 120 correctly, e.g., produce the correct classification on the images. However, it may happen that some images are classified in an unexpected way. For example, an image may unexpectedly be classified as NOK, although nothing appears amiss. For example, an image may unexpectedly be classified as OK, although the image shows a faulty product, e.g., having a missing part. In other words, the classification boundary of classifier 130 may not be entirely correct, which some images falling at the wrong side of the boundary.

To assist the engineer configuring the manufacturing line and, in particular, classifier 130, he/she may use an embodiment of image processing system 100. Indicated with a dashed line is a connection from sensor 120 to system 100. The connection is dashed because in normal operational use the image processing system 100 may not always be used. For example, system 100 may be used to visualize what changes one needs to make in image 121 to change a classification, e.g., to go from NOK to OK. For example, system 100 may be used to change an unexpected NOK to OK. In this way, it can be visualized what the classifier considered to be wrong in image 121. Likewise, system 100 may be used to verify what is needed to go from an OK to a NOK classification according to classifier 130. For example, if classifier 130 works as expected, it might, say, remove the HF part from an image of a circuit board to change classification from OK to NOK.

Figure 1C:
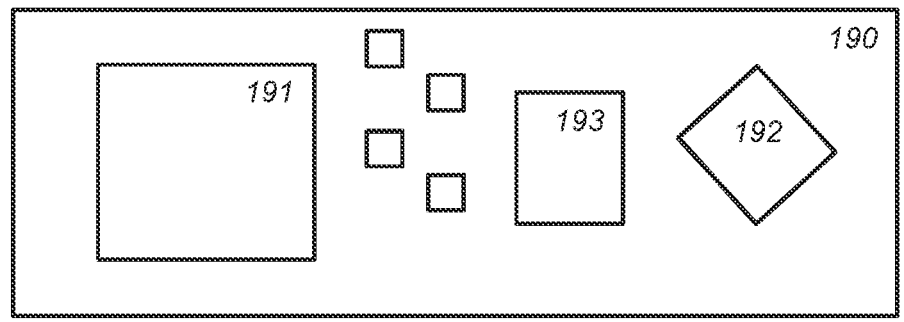
FIG. 1c schematically shows an example of an embodiment of an image and altered image in accordance with the present invention.
Figure 1C:
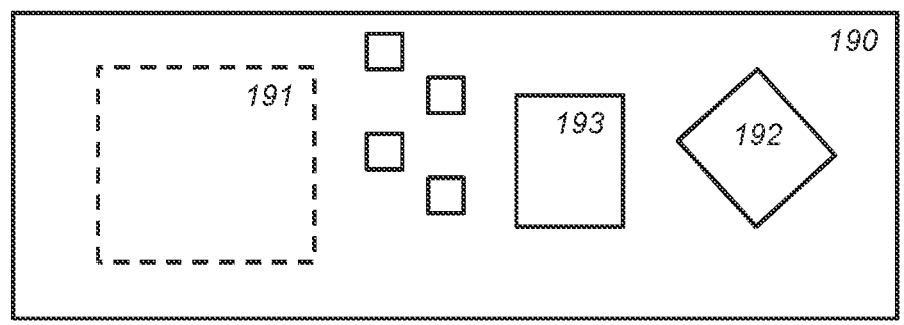
Figure 1C:
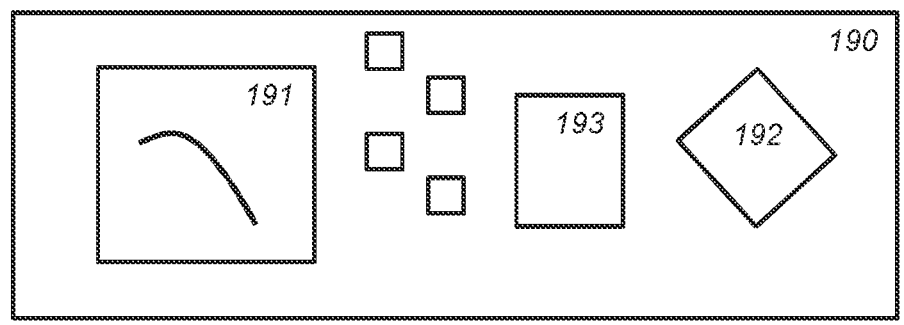

FIG. 1c schematically shows an example of an embodiment of an unaltered image A. In this case, the image shows a circuit board on which a number of components, have been assembled; components 191, 192 and 193 are provided with a reference numeral. For example, image A may receive classification OK from classifier 130. Using an embodiment, the classification may be changed to NOK. For example, the image B shows a missing part 191. For example, image C shows a scratched part 191. In this case, the images B and C appear to be correctly classified as NOK. This indicates that the classifier correctly learned that a missing component or a scratched component would change the classification. However, it may happen that an OK image is changed in an inconsequential way (not shown in FIG. 1c), e.g., a slight change in illumination or focus; in this case the classification may incorrectly be changed to NOK. In this case, an example would be found of an image that is classified as NOK while it should be classified as OK. One could use such images to retrain the classifier.

For example, one could steer the embodiment when presented with OK image A towards image B by including in the second set NOK images that show a missing component; or towards image C by including in the second set NOK images that show a scratch.

Likewise, when system 100 is applied to a NOK image, it may happen that the problem, e.g., the missing part, is not fully corrected in the image. In that case, an example is obtained of an image that is incorrectly classified as OK—even though, say, a human operator would still classify it as NOK.

Figure 1D:
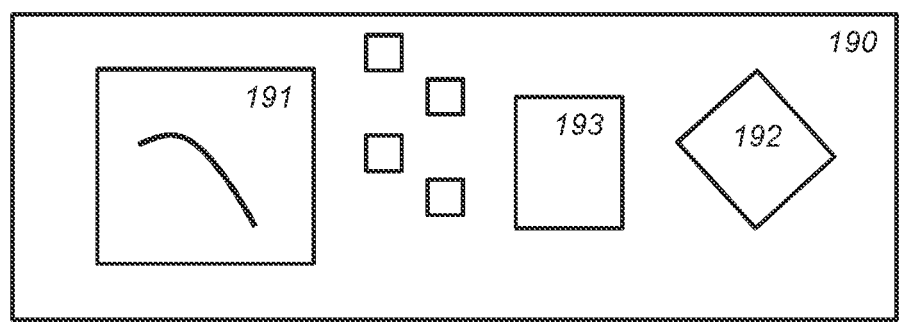
FIG. 1d schematically shows an example of an embodiment of an image and altered image in accordance with the present invention.
Figure 1D:
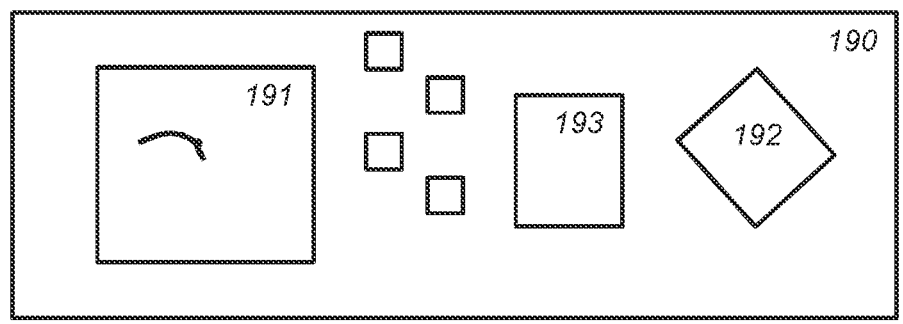

FIG. 1d schematically shows an example of an embodiment of an unaltered image D. Image D represents schematically an image obtained from a sensor installed in an optical inspection system for a circuit board manufacturing line. As an example, consider that image D was correctly classified as NOK by the image classifier, probably due to the scratch on component 191. Using an embodiment, an altered image E, e.g., a counterfactual may be generated for a classification of OK. However, review shows that the image should not be classified as OK. Although the scratch reduced in length, the scratch is still present. Accordingly, an image has been found which is both realistic, e.g., natural looking, similar to other images obtained from the image sensor, but it is classified wrong. Image E may be used in retraining the classifier, together with the class NOK.

For example, one may test how classifier 130 understands scratched, by including in the first set, NOK images with a scratch. In this case, it will try to improve the image by removing scratches.

FIGS. 1c and 1d take a correctly classified image as the starting point, but an embodiment may also be applied to incorrectly classified images. This contributes to an understanding of why a particular image was classified wrong. This understanding may then be followed up by, e.g., performing a new training with different parameters, e.g., to counter over-training, or by retraining with generated images to correct a problem in the classification boundary, etc.

In a typical optical inspection case, the samples in optical inspection look very much like each other. Apart from small variations, it is the same picture over and over again. Furthermore, the reasons for most NOK classification are very contained. If you change the style locally, then you know where the changes took place. Because of the high similarity between subsequent images, a good way to visualize the altered images is to subtract the original from the altered image, e.g., from the counterfactual. The difference image may point to a component or scratch that appeared or disappeared.

Thus, embodiments may be employed for explainability in automated optical inspection. Components may be processed across a manufacturing line and may be inspected by an automated system that decides whether to further process them (OK) or to discard the component (NOK). In the latter case, it is useful to know the reason the component is being discarded—for example, to improve the classifier 130, to debug the system, to test the system, to obtain further training images, and so on.

The reason that a component is being discarded may be obtained by comparing the original input image to a set of counterfactuals produced by an embodiment. In other words, given an image with a discard classification, e.g., NOK, an altered image may be generated with a not-discard classification, e.g., OK. This altered image explains the original classification since it tells operator 'If the sample looked like this then it would not have been classified as NOK'. In fact, generating one or more counterfactuals may be automated, e.g., as soon as a NOK image is obtained from sensor 130.

In an embodiment, one could even configure the manufacturing line to make decisions based on changes between an image 121 and the counterfactual 161, e.g., flag the sample for further manual inspection, steer a sorting system, or alter the parameters of the manufacturing process itself. For example, if the changes in the altered image show small localized defects that are known to be side effects, say, of high temperatures, pressure, etc., at some stage of the processing pipeline, then these control factors could automatically be adjusted to adjust the probability of the defect re-occurring in the future. Depending on the individual use case, this could be done using a rule-based system, or, e.g., a reinforcement-learning based system that takes the output of the present method as its input.

Returning to FIG. 1a. FIG. 1a shows an embodiment of the image processing system 100. Image processing system 100 is shown in the context of an extended image processing system 101, in which image processing system 100 may form a part. Extended image processing system 101 shows an image sensor 120 obtaining an image 121. The image may be a visible light image, infrared, x-ray image and so on. Which modality is used depends on the type of classification for which one may use the classifier. For example, to classify objects and/or persons near an autonomous vehicle, one may use a visible light image sensor, or a LIDAR image, etc. For example, to classify air bubbles in welds, one may use an X-ray sensor, since otherwise the defects would not be visible.

Applications of the image processing system 100 include optical inspection, but various other classification applications, e.g., a surveillance system or a medical imaging system, etc. The counterfactuals produced in an embodiment and/or a comparison between the counterfactual and the original input image are an important source of information for both model developers and end users as well, as it delivers actionable information on the state of the used classifier model and/or of the available data, e.g., by revealing hidden biases that would otherwise have been undetectable through traditional performance assessments methods like sensitivity or specificity measurements. These counterfactuals and/or their differences to the original input may be outputted visually to, e.g., a supervisor of an automated optical inspection pipeline as a quality assessment measure.

The sensor 120 to obtain the image 121 may use various image modalities, e.g., video, radar, LiDAR, ultrasonic, motion, thermal imaging camera, visible light imaging, etc. Embodiments leverage the representation of information as a 2D spatial grid, which works well on image data. The image classifier may be configured to classify the sensor data, e.g., detecting the presence of objects in the sensor data, e.g., regarding objects such as: traffic signs, road surfaces, pedestrians, vehicles, etc., depending on the use case. Image processing system 100 may be used to detect anomalies and to identify the cause of the anomaly.

For example, explainability in the context of, e.g., automated optical inspection may involve anomaly detection and may also involve attribution of classification decisions to these anomalies. Apart from explainability, image system 100 may be used to generate further training data, which improves the quality of classifier 130, and eventually the quality of end-products, e.g., an ECU or a car, etc.

For example, in an embodiment, the image processing system 100 may comprise a processor subsystem configured to alter the input image 121. In FIG. 1a, the processor subsystem is not shown separate from the other elements of system 100. FIG. 1a also shows an extended system 101 including image processing system 100. The extended system 101 may include for example a sensor 120 for generating the input image 121. The extended system 101 may include for example a database 150 with training images for training classifier 130 using a classifier trainer 132.

Image processing system 100 and/or extended system 101 may comprise a processor system, a memory, and a communication interface. Systems 100 and/or 101 may communicate internally, with each other, external storage, input devices, output devices, and/or one or more sensors over a computer network. The computer network may be an internet, an intranet, a LAN, a WLAN, etc. The computer network may be the Internet. The systems may comprise a connection interface which is arranged to communicate within the system or outside of the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna. System 100 and 101 may use in addition or instead an internal communication mechanism, e.g., a bus, and API, etc.

The execution of systems 100 and/or 101 may be implemented in a processor system, e.g., one or more processor circuits, e.g., microprocessors, examples of which are shown herein. FIG. 1a shows functional units that may be functional units of the processor system. The processor circuit(s) are not shown separate from the units in these figures For example, the functional units shown in FIG. 1a may be wholly or partially implemented in computer instructions that are stored at systems 100 and/or 101, e.g., in an electronic memory of said systems, and are executable by a microprocessor of said system. In hybrid embodiments, functional units are implemented partially in hardware, e.g., as coprocessors, e.g., neural network coprocessors, and partially in software stored and executed on system 100 and/or 101. Parameters of the classifier 130 and/or training data 150 may be stored locally at system 100 or externally in system 101, and may be stored in cloud storage.

System 100 comprises an interface 110 configured to receive data objects, e.g., the input image 121 or the trained classifier 130. For example, the interface may comprise an API for receiving the input image 121. Interface 110 may be used to obtain other data, e.g., average difference vector 141, etc. Interface 110 may comprise multiple sub-interface, e.g., of different modalities. For example, interface 110 may comprise a storage interface, e.g., to local storage or to cloud storage, to retrieve the trained classifier, etc.

Image processing system 100 comprises a trained classifier 130. For example, trained classifier 130 may comprise a deep neural network configured for classification, e.g., by learning representations of their inputs in a latent space, and then classifying their inputs from these deep features. For example, the network of classifier 130 may be organized in a series of layers or blocks of layers; At least one of these layers comprises multiple convolutions. The network may also comprise other known neural network operators, e.g., non-linear activations functions such as a ReLU layer.

For example, trained classifier 130 may comprise at least one layer comprising multiple convolutional filters. When a classifier is applied to an image, the convolutional filters produce filter activations, e.g., the outputs of said filters when the neural network is applied to the input image.

Trained classifier 130 may be trained using a supervised training algorithm, e.g., a backpropagation algorithm, on a set 150 of training images and corresponding classifications. For example, a classifier trainer 132 may be configured to train classifier 130 using the set 150. To retrain classifier 130, one may add new training images and corresponding classification to set 150 and start the training again. However, one may also start the training from the already trained classifier, and train it on the new images possibly mixed with existing training images from set 150. The latter is more efficient. In either case, the new images may be given a higher weight than existing images so that the neural network receives a stronger learning signal.

The first set of images and/or the second set of images which may be used to steer the altering process may be taken from the training set 150. For example, a first and/or second set may be selected from set 150 with a chosen classification; possibly the selection is random. The selection may be deliberate instead of random. They may be predetermined, e.g., curated and provided with an embodiment. Instead of modifying, e.g., retraining, classifier 130, one may also train a new classifier altogether, e.g., from database 150 preferably extended with additional altered images to improve the classification boundary of the new classifier.

Interestingly, the first and second sets may be used to define a texture statistic, e.g., a style, that is to be transferred from the input image to the altered image. This can be implemented by aggregating the statistics from these subsets as given by the Gram matrix representation.

The trained classifier 130 is used in system 100 at least to establish the classification of the input image, that is the source classification 131. For example, the trained classifier may be applied to input image 121 to obtain source classification 131. While trained classifier is applied to input image 121, the filter activations of the convolutional filters may be recorded. It is possible, but not necessary to record all convolutional filter activations; for example, recorded filter activations may be restricted to one or more layers of interest.

For example, in an embodiment, the trained classifier may be configured with an API configured to receive a selection of layers. When classifier is applied to an input image, the filter activation in the selected layers are exported. This API can be used for example, to compute averaged difference vectors 141. Instead of layers, individual filters may also or instead be selected.

Extended system 101 may comprise an average filter activation computer 140 to compute an average filter activation difference 141. The average filter activation difference 141 may be precomputed which is why the average filter activation computer 140 is shown in FIG. 101 as part of the extended system 101 and not in the image processing system 100. Average filter activation computer 140 may also be part of image processing system 100. Also set 150 may be part of image processing system 100. Precomputation can be advantageous, e.g., if altered images are computed automatically, e.g., for any input image 121 for which classifier 130 generates a NOK classification. Precomputation is not needed, however. A dashed connection is shown between average filter activation computer 140 and classifier 130 because the filter activations used by computer 140 are obtained from a same classifier, e.g., using the same neural network filter parameters.

In an embodiment system 100 may be provided with multiple average filter activation difference 141. For example, a first difference 141 may indicate how filters in an OK image typically when a scratch is present; a second difference 141 may indicate how filters in an OK image typically when a component is missing. For example, system 100 may be configured for a user to select one of the multiple precomputed average filter activation differences. For example, system 100 may be configured to compute counterfactuals for all of the multiple average filter activation difference 141, e.g., automatically. Instead of precomputed differences, system 101 may be configured with the corresponding first and or second sets, so that a user may select from those.

Average filter activation computer 140 is configured to determine how, on average, filter activations change between a typical image of a first kind and a typical image of a second kind; for example, between a typical image of a first classification and a typical image of a second classification. Typically, the first classification is the source classification.

Average filter activation computer 140 may be configured to compute an average filter activation difference comprising a measure for a difference in filter activations of a first set of images 151 having the source classification and a second set 152 of images having a target classification. For example, average filter activation computer 140 may apply trained classifier 130 to the images in the first set and to the images in the second, record the relevant filter activations and average them for each set. A measure may be applied to the averaged difference between filter activations in the trained classifier for the first set of images and filter activations in the trained classifier for the second set of images. Applying some summarizing measure has the advantage that the optimization described below will be less adversarial and more natural. For example, the measure may be a function applied to activation differences, in particular difference vectors. The function typically maps a set of these vectors to a set of summarizing values. To make the comparison meaningful, the same measure or function is applied to the difference in activations between the input image and the altered image.

A good choice for the measure is to compute second order, e.g., quadratic, forms over the averaged filter activations. In a sense these are representative for second order statistics on the filter activations. In particular one may take multiple, or even all inner-products; in particular the so-called Gram matrix is particular useful choice for the measure. For example, a Gram matrix may be computed for the average filter activation differences, e.g., as defined for the first and second set, while a Gram matrix is also computed for the filter activation differences, e.g., as defined for the input image and altered image.

Image processing system 100 may comprise an altered image optimizer 160, e.g., in the form of a set of computer program instructions stored in an electronic memory of system 100.

Altered image optimizer 160 is configured to obtain the average filter activation difference 141. Altered image optimizer 160 is further configured to obtain the altered image 161. The altered image 161 may be obtained through a process of iterated optimization, starting with the unaltered input image 121. The goal of altered image optimizer 160 is to find an altered image in which the filter activations have changed in a way that matches how filter activations changes between images that are typical for images of the input class and images of the desired target class. At the same time, altered image optimizer 160 may optimize other constraints. For example, it may be required that the altered image 161 has a particular target classification. For example, the target classification may be configured into system 100, but may also be obtained, e.g., as an input to system 100.

For example, altered image optimizer 160 may be configured to determine altered image 161 for input image 121, by optimizing at least: a classification score and a similarity score. Optimization of the classification score may be configured to push the altered image towards different classification. For example, the classification score may comprise a distance between a classification of the altered image and the target classification. Optimizing of the similarity score to reduce a distance between the average filter activation difference and a measure for a difference in filter activations between the input image and the altered image. Note, preferably it is not the difference between the average filter activations which is minimized, but rather the difference of the measures of the average filter activations, e.g., the differences of the Gram statistics, not the activations themselves.

For example, the similarity score may be or comprise a loss term such as: $LG(x') = \Sigma_l \| G^l(D^l(Cx, Cy)) - G^l(D^l(x, x')) \|$.

In this equation, x denotes the input image and x' the altered image. The part on the left: $G^l(D^l(Cx, Cy))$ denotes a measure for typical change in filter activation, while the part on the right denotes the change in filter activation when comparing the altered image to the input image. The operator $D^l(x, x')$ denotes the difference in filter activations at layer l for the input image x and the altered image x'. A similar computation may be done for images that represent the desired change in the input image. For example, $D^l(Cx, Cy)$ denotes the same filter activation difference but for the first and second set, e.g., averaged. For example, $D^l(Cx, Cy) = F_{C_x}^l - F_{C_y}^l$, wherein $C_x$ is the first set, $C_y$ is the second set, $F_{C_x}^l$ and $F_{C_y}^l$ are averaged filter activations at layer l for the first set $C_x$ and second set $C_y$ respectively. For example, $D^l( )$ may comprise one vector for each convolutional filter in layer l.

Finally, as pointed out, it is not needed to take the filter activations themselves, or in fact, preferred, instead a measure can be taken over them to summarize them to some degree. As pointed out, using the Gram matrix for this worked particularly well. According, $G^l$ denotes the Gram operator to compute a Gram matrix from a set of vectors.

The Gram matrix is a way to abstract the input data representations from the learned features. Such a measure is preferably abstract enough to be invariant to, e.g., spurious artifacts in the underlying features (activations), but at the same time still expressive enough to capture the behavior of the activation pattern. The Gram matrix does this effectively by comparing activation filters in a layer pair-wise and summarizing the result into a matrix which is a fingerprint for the behavior present in a layer. The Gram matrix works for this purpose; The pair-wise comparison of filters gives this measure a distinct advantage over simpler ones such as mean & standard deviation, etc.

In an embodiment, the measure applied to the filter activations comprises a correlation matrix computed for a kernel function. The Gram matrix uses correlation in the form of inner product multiplication between different filter outputs. Accordingly, the inner product to find correlation may be replaced by other measures for correlation, e.g., Pearson Correlation. Furthermore, the linear kernel function used for Gram matrix: $k(x, y) = x^T y$, may be replaced by other choices, for example, a polynomial kernel may use: $k(x, y) = (x^T y + c)^d$, e.g., using d=2.

For example, a Gaussian kernel may use:

$$k(x, y) = \exp\left(-\frac{\|x-y\|_2^2}{2\sigma^2}\right).$$

For example, the difference between filter activations in the trained classifier or the averaged difference between filter activations in the trained classifier may be represented as a set of vectors. For example, the output of a filter may be represented as a vector, and so can the difference between two filter outputs. To improve similarity further processing may be done on these vectors. For example, a matrix may be obtained by applying a kernel function to each combination of difference vectors between activation in for the first set of images and the second set of images. Choosing the inner product as the kernel function one obtains the Gram matrix.

Besides the similarity score and the classification score, other criteria may be added to further improve the altered image. For example, in an embodiment, the optimization may further include minimizing an uncertainty estimation of the altered image. The latter further increases the similarity between the altered image and the training images.

Below a further detailed embodiment is described, which could be implemented in image processing system 100 together with the extended system 101. Let A be the activations of the model on some sample x and B the activations of the model on some sample y, so that x and y belong to different classes. Once conceivable way of generating a counterfactual for x would be to interpolate its activations A towards B. Although this approach is possible, and it will be possible achieve counterfactuals in this manner, this approach has disadvantages. First of all, it conditions the search on a specific B and therefore on a specific y. However, it is not necessarily clear how to pick y appropriately. Secondly, this uses a simple linear model for the transformation which will most likely not result in a path through the model's latent space that corresponds to natural-looking images.

A better approach is to map the latent space to a different representation in order to avoid this latter issue. Let $F_i^l$ be filter i at layer l in the input model M, e.g., the trained classifier, and let $F_{i,k}^l$ be the k-th value in the flattened filter l feature map. Then, consider all pairs of filters i,j and build a symmetric Gram matrix for layer l given as:

$$G^l(i,j) = \Sigma_k F_{i,k}^l \cdot F_{j,k}^l$$

This representation computes the pairwise correlations between the given features in a layer and therefore summarizes the relative activations of features in a given layer. Note that the value depends not only on the magnitude of the individual filter activations, but also their direction in high dimensional space.

This information is useful in producing counterfactuals as it does not resort to specifying or requiring an additional explicit representation y as in the example above. One can thus create a counterfactual that does not necessarily have the exact same latent representation as a fixed example y, but rather a representation that shares the same style as quantified by the Gram matrix above. Creating such a counterfactual therefore may be done by optimizing along a trajectory dictated by how this measure may be maximized.

This trajectory may depend on an additional set of factors. This is advantageous since, often, an input image may be interpreted in many different ways. For example, in the binary optical inspection scenario, discussed above, an input image may be considered NOK because of different reasons, e.g., there is a textural irregularity present on the surface of the component, some key component is missing, the illumination of the image is incorrect, etc. These may all be considered different explanation modes. Interestingly, the counterfactual generation trajectory may be customized by conditioning its start and end on one or more of these modes.

This can be accomplished relatively inexpensively. Let $C_x$ be a set of inputs. For example, $C_x$ may be user-defined and may represent one or more of these concepts as above. Let $F_{C_x}^l$ correspond to the distribution of filter responses at layer l for the sample set $C_x$. This distribution may be computed by aggregating, e.g., summing, averaging, etc., over the responses of the individual samples in the example set. Then, given another concept described by the feature distribution $F_{C_y}^l$, one can model a trajectory from $F_{C_x}^l$ to $F_{C_y}^l$ and apply this trajectory to an input sample x as follows in order to generate a counterfactual for it.

In order to find the conceptual direction from $C_x$ to $C_y$, one can compute the activation delta for each layer as follows:

$$D^l(C_x, C_y) = F_{C_x}^l - F_{C_y}^l$$

This result will be low where the model reacts to concepts $C_x$ and $C_y$ in a similar manner, and have a high absolute value where the concepts differ. Given a new input x that is to be interpreted under concept $C_x$, but want to re-interpret under concept $C_y$, one can compare $D^l(C_x, C_y)$ with the corresponding activation differences of the original input x and a new input x':

$$D^l(x, x') = F_x^l - F_{x'}^l$$

Where $F_x^l$ as above are the filter responses to the input x, and $F_{x'}^l$ are the filter responses for x'.

The goal is to find a counterfactual x', e.g., an altered image, for which this similarity may be maximized. As discussed above, the similarity is preferably not measured directly on feature differences above, but rather on their summary representation via a measure applied to them such as the respective Gram matrix computations:

$$L_G(x') = \Sigma_l \| G^l(D^l(C_x, C_y)) - G^l(D^l(x, x')) \|$$

Where $G^l(\bullet)$ is the Gram matrix as per the definition above but using the feature activations given by its input. Note that it is differentiable with respect to its input. The $\|\bullet\|$ function may refer to any common lp norm, e.g., the l1 or l2 norm, and l indexes the layers of the input model. Accordingly, this finds an input x' such that the activation differences to the root or starting sample x behave like the differences between the concepts $C_x$ and $C_y$. In order that new image x' is counterfactual, e.g., classified differently from x, one may model an additional loss:

$$L_{class}(x')=\Phi(f(x'), T_C)$$

Where f(x') is the classification output computed by the input model M, e.g., typically the final softmax vector of sample x', and $\Phi$ is a function which takes a target threshold $T_C$ and quantifies its difference from the model prediction. For example, f(x') and $T_C$ may be softmax vectors and $\Phi$ may be an entropy loss. Typically, $T_C$ can be chosen according to a target counterfactual class of choice. $\Phi$ can alternatively model the distance of f(x') from f(x) in an unguided sense, without requiring $T_C$. Computing a classification from the final layer of a classifier M, can use a different formula, in which case the latter formula may be incorporated in a classification loss function.

Optionally, depending on the use-case it might be preferred to include an additional regularization for x' in order to guard against values that represent out-of-distribution inputs for the input model M. For example, one may rely on any number of differentiable uncertainty estimation techniques. For example, one may model a probability measure for the counterfactual x' as p(x') which one can use directly as Lp(x'). These loss terms can be combined as follows:

$$L_{total}(x')=L_G(x')+L_{class}(x')-L_p(x')$$

This may be a weighted sum between the individual sub-loss terms; these hyperparameters are not specified above for the sake of brevity. The hyperparameters may be taken as 1 or −1 as written or may be optimized for the particular application, e.g., empirically. As the total loss is differentiable with respect to x', one can use common optimization schemes such as SGD or ADAM to find a minimizer x' for the energy above.

An additional factor to consider is the set of filters which are used for the optimization, e.g., the filters in layers l over which the summation of $L_G$ occurs. In an embodiment, one can for instance take all of the filters of the model. One could also take any subset of these filters. This will constrain the optimization to finding a counterfactual x' that will be restricted to stylistic changes at a given abstraction level. For instance, using only earlier layers would restrict all but low level textural changes.

In the various embodiments of systems 100, 101, etc. communication interfaces may be selected from various alternatives. For example, the interface may be a network interface to a local or wide area network, e.g., the Internet, a storage interface to an internal or external data storage, a keyboard, an application interface (API), etc.

The systems 100 and 101 may have a user interface, which may include well-known elements such as one or more buttons, a keyboard, display, touch screen, etc. The user interface may be arranged for accommodating user interaction for configuring the systems, altering an image, retraining a classifier, etc.

Storage may be implemented as an electronic memory, say a flash memory, or magnetic memory, say hard disk or the like. Storage may comprise multiple discrete memories together making up storage 140, 180. Storage may comprise a temporary memory, say a RAM. The storage may be cloud storage.

System 100 or even system 101 may be implemented in a single device. Typically, the systems comprise a microprocessor which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, systems 100 and/or 101 may comprise circuits for the evaluation of neural networks.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 2:
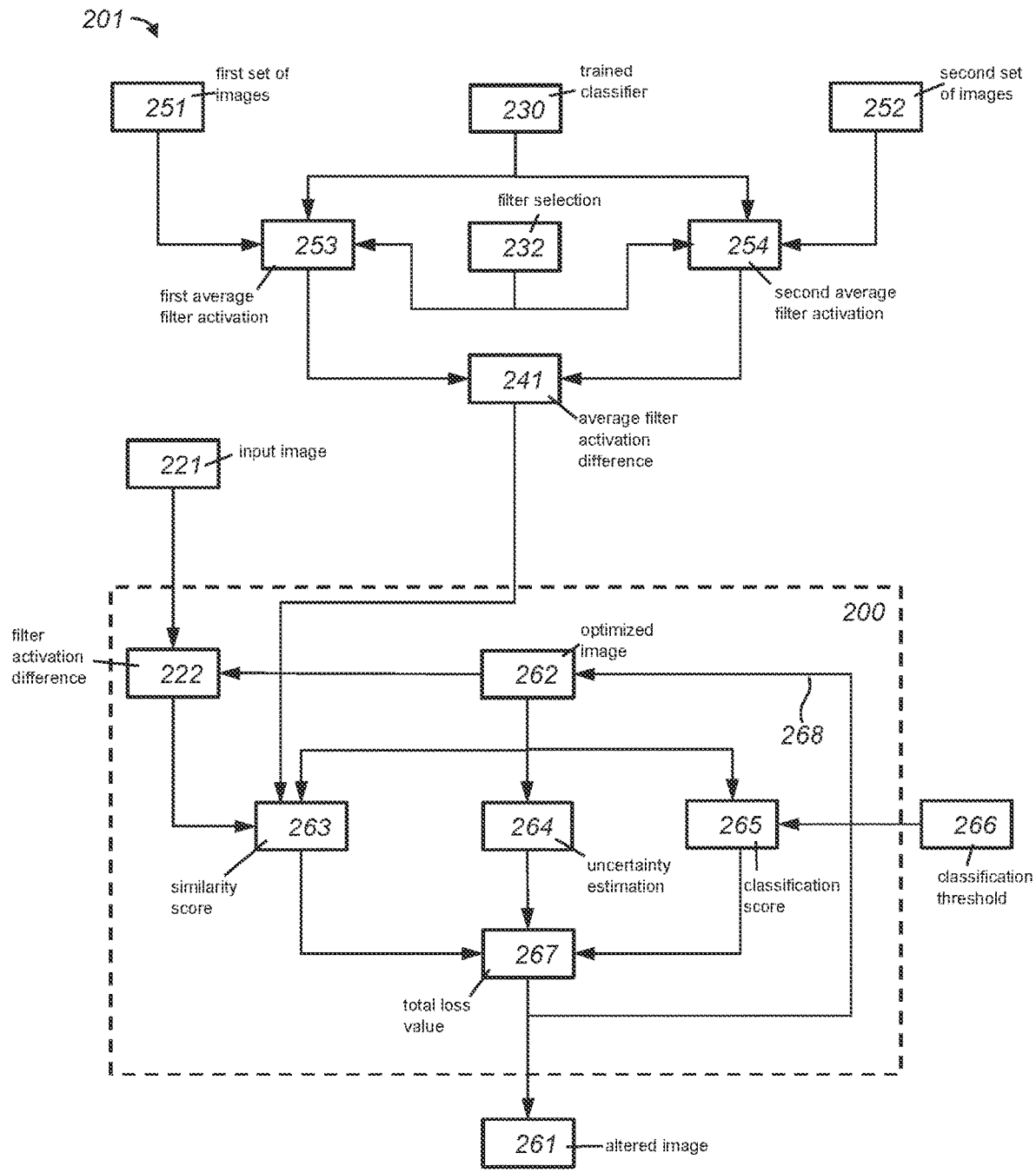
FIG. 2 schematically shows an example of a flowchart for altering an image, in accordance with the present invention.

FIG. 2 schematically shows an example of a flowchart 201 for altering an image, part of flowchart 201 is flowchart 200 which is specific for the computation performed in dependence upon an input image, and which cannot therefore be precomputed. The latter part has been indicated with a dashed box.

Method 201 works on a trained discriminative model M, e.g., a trained classifier, and sample input x, e.g., an image, e.g., an image obtained from an image sensor. The shown method proceeds as follows: Given the activation distributions for two concept example sets $C_x$ and $C_y$ using an input model M, a counterfactual x0 is optimized to imitate the differences between $C_x$ and $C_y$ when compared to an input x. This occurs in an inner optimization loop which also aims to change the class membership of x0 and optionally, also includes additional regularization, e.g., to encourage solutions for which the model has low uncertainty.

Shown in FIG. 2 are a first set of images 251, and a second set of images 252, a trained classifier 230 and filter selection 232. The latter may for example indicate particular layers in model 230 that are to be taken into account for the optimization.

First average filter activation 253 are computed for first set 251, and second average filter activation 254 are computed for second set 252. From the average filter activations 253 and 254, an average filter activation difference 241 is computed. The latter may involve a measure such as a Gram matrix.

The average filter activation difference 241 is used to steer the optimization in the correct direction. An input image 221 is received, and the altered image x0 is initialized. A good choice is to initialize the optimizing image 262, e.g., x0, to the input image x. This has the advantage that the alteration performed in the optimizing image 262 can also be controlled by the number of optimization cycles, e.g., in addition to the loss terms employed. A filter activation difference 222 between the input image and the optimizing image 262 is computed. Optimizing image 262 will at some point be output as the altered image 261.

A similarity score 263 is computed from the filter activation difference 222, e.g., by applying the measure, e.g., the Gram matrix. The similarity score may be a value, e.g., a floating-point value, that is computed from difference vectors—first difference vectors for the input image an altered image, and second difference vectors between two typical images. The Gram matrix, or other measure may be computed independently over the first difference vectors and over the second difference vectors. The difference of these measures, e.g., the Gram matrix, may in turn be summarized in a single value, e.g., by computing a norm over the difference matrix. The norm may be a Euclidean norm, or the like.

Other loss terms can also be computed, for example, an uncertainty estimation 264 and a classification score 265 can be computed from the optimizing image 262. The classification score 265 may also depend on a classification threshold 266. The latter is optional, and may, e.g., be fixed. The loss terms, possibly weighted are combined into a total loss value 267. An optimization loop 268 uses the total loss value 267 to generate a new optimizing image 262. For example, by differentiating the loss function and applying that to alter the image in a direction that reduces the loss function.

At some point, the optimizing image 262 is output as the altered image 261. For example, a terminating condition may be a predetermined number of optimization cycles. For example, a terminating condition may be reaching a predetermined value of the loss function, or of any of the sub-losses. A combination of the latter two is also possible.

For example, in an embodiment the method may be applied as follows:
1. Select example sets $C_x$ and $C_y$ that represent the starting concept x, e.g., the input image, and the target concept respectively. Typically, $C_x$ will be chosen as examples similar to x in some way; for example, in the case of optical inspection, samples of the same class as x (e.g. NOK). This may be done fully automatic, e.g., based on the classification computed for x by the image classifier. For example, these sets may comprise a number of images selected to have the same source classification and target classification. For example, these sets may be selected randomly from the training images.

For more precise results, the sets may be selected to conform to particular aspects that an engineer needs to verify in the trained classifier. For example, $C_x$ may be chosen to comprise image samples that belong in that class, e.g., the NOK class, for the same reason, e.g., the same sort of defect on the component, etc. Likewise, $C_y$ may be chosen to represent one or several modes of the counter class (e.g. OK). The engineer working with the classifier can use the flexibility in choosing sets $C_x$ and $C_y$ with great effect. Giving him/her great control over the aspects of the classifier that he/she wants to explore.

Note that the trained classifier does not need to be a binary classifier. For example, the classifier may be trained to classify into one of several types of NOK classifications, e.g., scratches, missing components, unusable image, e.g., out of focus, over exposed.

2. Make a selection of the layers/filters to use. Typically, this will be all the filters in the network, but may also be restricted to, e.g., only a subset of the latter filters, or the earlier filters in the model. The method may also be repeated with different filters, e.g., the filters from a different layer. This may be used to generate different type of counterfactual starting from one starting image.
3. Compute the concept activations $F^l_{C_x}$ and $F^l_{C_y}$ for the filter selection. These distributions may be modelled by, e.g., aggregating (e.g., averaging, summing, etc.) over the activations of the individual samples in $C_x$ and $C_y$. Compute $D^l(C_x, C_y)$.
4. Set x0=x.
5. Compute the (possibly weighted) sub-losses $L_G(x0)$, $L_{class}(x0)$ and $L_p(x0)$ and the total loss $L_{total}(x0)$.
6. Find a minimizer x' for $L_{total}$ using an optimizer such as SGD or ADAM. Assuming the class membership of x' differs from that of x, and that $L_p(x')$ surpasses some threshold, x' is a counterfactual to x. In order to avoid making unnecessary changes to x', the optimization may be subject to, e.g., early stopping as soon as the class membership of x' meets its requirements. Return this counterfactual to the user. The optimization may be deterministic, may also involve some randomization. The latter can be used to generate multiple counterfactuals for a given input image.
7. Depending on the use-case preferences or requirements, repeat from step 2 with a different selection of layers and filters to use.
8. The computed counterfactual may be displayed to the user in some form. They may be forwarded to downstream processing tasks. This postprocessing could comprise, e.g., a further classification model to further classify or assess the explanation mode and actuate on the production system Counterfactuals generated by an embodiment that are classified incorrectly by the classifier may be used for retraining.

Figure 3:
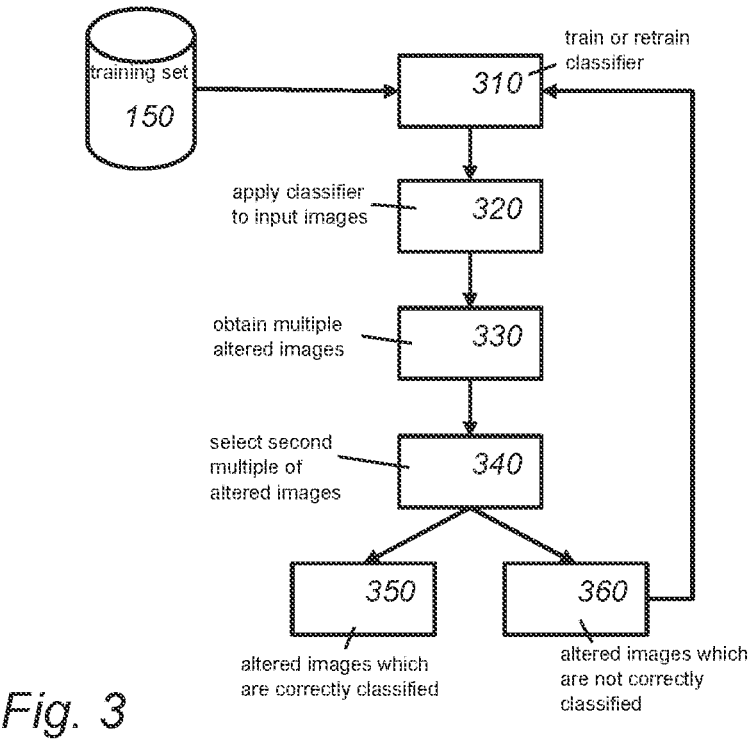
FIG. 3 schematically shows an example of a flowchart for retraining a neural network, in accordance with the present invention.

FIG. 3 schematically shows an example of a flowchart 300 for retraining a neural network. Shown in FIG. 3 is:

Training or retraining (310) a classifier, in particular a neural network classifier. The training may use a set of training images and training classifications 150.

A typical approach for the initial training of the classifier, is to take a pre-trained model, e.g., trained on ImageNet, followed by retraining of the upper layers. In this way, fewer training data is needed. In practice useful classifier for optical inspection need only a couple of thousand images to train model;

Applying (320) the classifier to one or more input images. The images may be training images, and/or may be new images obtained in practice;

Obtaining (330) a first multiple of altered images from the input images. One may generate one altered image for every input image, but one may also generate multiple altered images. For example, altered images may be generated from different first and second sets. For example, the sets may be generated for a different target classification. For example, altered images may be obtained by different optimizations;

Selecting (340) from the first multiple of altered images a second multiple of altered images for which the trained classifier produces an incorrect classification and obtaining corresponding corrected classifications. Given an input image and a target classification, an embodiment may well generate an altered image that is correctly classified differently. For example, given an OK image, an embodiment may correctly generate an altered image that is, and ought to be, classified as NOK. Likewise, given a NOK image, say with a missing component, an embodiment may correctly in-paint the missing component, so that the altered image correctly receives, and ought to receive, the OK classification. Successfully transitioning from a NOK to an OK classification, is easier if the images are simple and/or predictable, such as in optical inspection cases.

However, some altered images will be classified differently, while they should not be. The latter is especially likely for NOK images, although an embodiment may improve the image, it may for whatever reason not fully remove the defect. Such images are particularly useful for retraining, as they can improve the classifier for false positives. The latter type of error—giving an OK classification for a not-ok image—is particular important for practical applications such as optical inspection, since such an error may cause a bad component to be further processed in a manufacturing line. In practice, if the model says NOK then the part may simply be thrown out. Human costs come in when the model say OK, but really the part is not. The latter costs are typically higher.

It may be that some of the generated images, although far from being typically adversarial, do not look fully natural to the human observer. This issue can be reduced by including an uncertainty loss—images with lower uncertainty are more likely to look more natural. Moreover, for retraining, less natural images, especially when using counterfactual samples generated to transition from ok to nok, this is not a problem; Even if images may not be fully natural, they still represent defects and can be used to improve the classifier. The first and second set may be related to the OK/NOK classification; they may also be more specific.

Selecting altered images with an incorrect classification may be done by a human selection step. Selecting the altered images may also be done automatically, e.g., by using a more expensive, e.g., slower, classifier, but higher-quality classifier. Hybrids are also possible.

Shown in FIG. 3 the outcome of selection 340 may be box 350 for altered images which are correctly classified by the classifier, or it may be box 360 for altered images which are not correctly classified by the classifier.

Finally, image in box 360 may be used in step 310 for a retraining of the classifier, e.g., retraining the trained classifier at least on the multiple of altered images and the corrected classifications.

Advantages of embodiments include, the ability to take a very specific part of the decision boundary and correct it. From one or only a few images, many counterfactuals can be generated. Especially, from on NOK classified image, many images can be generated that the classifiers would consider as OK. By retraining on those images where this is not correct, but with the correct NOK classification, the classifier can be improved for this particular aspect.

Figure 4:
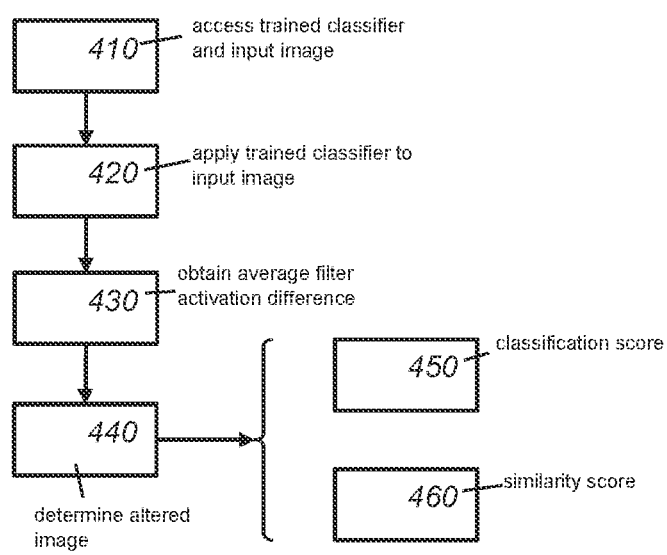
FIG. 4 schematically shows an example of a flowchart for altering an image, in accordance with the present invention.

FIG. 4 schematically shows an example of a flowchart 400 for altering an image. Method 400 comprises
- accessing (410) the trained classifier and the input image, the trained classifier comprising multiple filters,
- applying (420) the trained classifier to the input image to obtain a source classification (131),
- obtaining (430) an average filter activation difference (141) comprising a measure for a difference in filter activations of a first set of images (152) having the source classification and a second set of images (152) having a target classification,
- determining (440) an altered image (161) for the input image, determining the altered image comprises optimizing at least:
- a classification score (450) of the altered image to reduce a distance between a classification of the altered image and the target classification,
- a similarity score (460) to reduce a distance between the average filter activation difference and a measure for a difference in filter activations between the input image and the altered image.

For example, the method to alter an image, and/or to retrain a classifier may be computer implemented methods. For example, accessing training data, and/or receiving input data may be done using a communication interface, e.g., an electronic interface, a network interface, a memory interface, etc. For example, storing or retrieving parameters may be done from an electronic storage, e.g., a memory, a hard drive, etc., e.g., parameters of the networks. For example, applying a neural network to data of the training data, or to an input image and/or adjusting the stored parameters to train the network may be done using an electronic computing device, e.g., a computer. Optimizing the altered image may also be done with an electronic computing device, e.g., a computer. The output altered image may be displayed which is useful for an engineer working on image classifier, in particular neural network classifier, as the altered image informs the engineer about the technical state of the classifier, e.g., provides explainability. The insight thus obtained may be used to increase or decrease additional safety precautions, depending on the reliability of the neural network, to increase or decrease the number of layers or filters or training data of the neural network, and so on. The altered image may be used for retraining to improve or correct the classification boundary of the classifier.

A neural network in the classifier may have multiple layers, which may include, e.g., convolutional layers and the like. For example, the neural network may have at least 2, 5, 10, 15, 20 or 40 hidden layers, or more, etc. The number of neurons in the neural network may, e.g., be at least 10, 100, 1000, 10000, 100000, 1000000, or more, etc.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 201, 200, 300, 400, etc. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 5A:
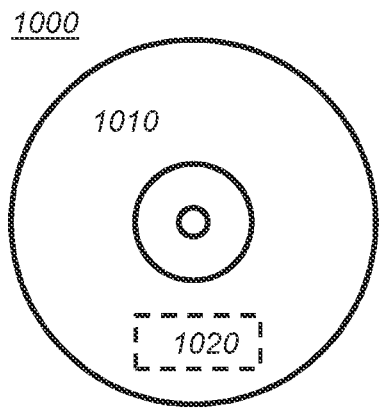
FIG. 5a schematically shows a computer readable medium having a writable part comprising a computer program according to an embodiment, in accordance with the present invention.

FIG. 5a shows a computer readable medium 1000 having a writable part 1010 comprising a computer program 1020, the computer program 1020 comprising instructions for causing a processor system to perform a method of altering an image, according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of altering an image.

Figure 5B:
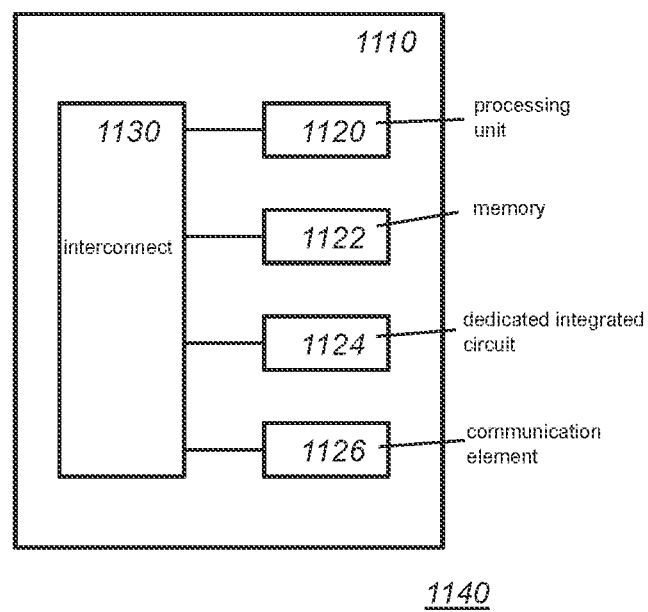
FIG. 5b schematically shows a representation of a processor system according to an embodiment, in accordance with the present invention.

FIG. 5*b* shows in a schematic representation of a processor system 1140 according to an embodiment of an image processing system, e.g., to alter an image. The processor system comprises one or more integrated circuits 1110. The architecture of the one or more integrated circuits 1110 is schematically shown in FIG. 5*b*. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the image processing system or device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

As used herein, the term "non-transitory" will be understood to exclude transitory signals but to include all forms of storage, including both volatile and non-volatile memories.

While device 1140 is shown as including one of each described component, the various components may be duplicated in various embodiments. For example, the processor unit 1120 may include multiple microprocessors that are configured to independently execute the methods described herein or are configured to perform steps or subroutines of the methods described herein such that the multiple processors cooperate to achieve the functionality described herein. Further, where the device 1140 is implemented in a cloud computing system, the various hardware components may belong to separate physical systems. For example, the processing unit 1120 may include a first processor in a first server and a second processor in a second server.

It should be noted that the above-mentioned embodiments illustrate rather than limit the presently disclosed subject matter, and that those skilled in the art will be able to design many alternative embodiments.

Use of the verb 'comprise' and its conjugations does not exclude the presence of elements or steps other than those stated. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device described as including several parts, several of these parts may be embodied by one and the same item of hardware. The mere fact that certain measures are described separately does not indicate that a combination of these measures cannot be used to advantage.

What is claimed is:

1. A computer-implemented method of altering an input image to provide an interpretability of a trained classifier, the method comprising the following steps:
   accessing the trained classifier and the input image, the trained classifier including multiple filters;
   applying the trained classifier to the input image to obtain a source classification;
   obtaining an average filter activation difference including a measure for a difference in filter activations of a first set of images having the source classification and a second set of images having a target classification; and
   determining an altered image for the input image, the determining of the altered image including optimizing at least:
       a classification score of the altered image to reduce a distance between a classification of the altered image and the target classification, and
       a similarity score to reduce a distance between the average filter activation difference and the measure for a difference in filter activations between the input image and the altered image.

2. The method of claim 1, further comprising the following step:
   displaying the altered image and/or a difference-image between the input image and the altered image.

3. The method of claim 1, further comprising the following step:
   retraining the trained classifier at least on the altered image.

4. The method of claim 1, wherein the trained classifier is trained through supervised learning on a training set of images and corresponding classifications, and wherein the first set of images and/or the second set of images are taken from the training set.

5. The method of claim 1, wherein the trained classifier includes at least one layer including multiple convolutional filters producing the filter activations.

6. The method of claim 1, wherein the accessing of the input image includes receiving the input image from an image sensor.

7. The method of claim 1, wherein the input image is obtained from an image sensor employed in a manufacturing line and the trained classifier is configured at least for ok/not-ok classification, and wherein further processing in the manufacturing line being dependent on the ok/not-ok classification.

8. The method of claim 1, further comprising the following steps:
   obtaining a first multiple of altered images from multiple input images and/or multiple target classifications;
   selecting from the first multiple of altered images a second multiple of altered images for which the trained classifier produces an incorrect classification and obtaining corresponding corrected classifications; and retraining the trained classifier at least on the second multiple of altered images and the corrected classifications.

9. The method of claim 1, wherein the obtaining of the average filter activation difference includes applying the measure to an averaged difference between filter activations in the trained classifier for the first set of images and filter activations in the trained classifier for the second set of images.

10. The method of claim 1, further comprising the following step:
obtaining difference vectors indicating a difference in averaged difference between filter activations in the trained classifier for the first set of images and filter activations in the trained classifier for the second set of images, the measure including applying a kernel function to each combination of difference vectors.

11. The method of claim 1, wherein the measure includes computing a Gram matrix.

12. The method of claim 1, wherein the optimizing includes minimizing a loss term, the loss term including $$LG(x')=\Sigma_l \| G^l(D^l(Cx,Cy))-G^l(D^l(x,x')) \|, \text{ wherein}$$

x' denotes the altered image,
$G^l$ denotes the Gram operator to compute a Gram matrix from a set of vectors, $$D^l(Cx,Cy)=F_{C_x}^l - F_{C_y}^l,$$

wherein $C_x$ is the first set of images, $C_y$ is the second set of images, $F_{C_x}^l$ and $F_{C_y}^l$ are averaged filter activations at layer l for the first set $C_x$ and second set $C_y$, respectively,
$D^l(x, x')$ denotes the difference in filter activations at layer l for the input image x and the altered image x'.

13. The method of claim 1, wherein the optimizing includes minimizing an uncertainty estimation of the altered image.

14. The method of claim 1, wherein the trained classifier is configured to selectively export filter activations when applied to the input image.

15. An image processing system for altering an input image to provide an interpretability of a trained classifier, the image processing system comprising:
an interface configured for accessing the trained classifier and the input image, the trained classifier including multiple filters; and
a processor subsystem configured to:
apply the trained classifier to the input image to obtain a source classification,
obtain an average filter activation difference including a measure for a difference in filter activations of a first set of images having the source classification and a second set of images having a target classification,
determine an altered image for the input image, the determination of the altered image including optimizing at least:
a classification score of the altered image to reduce a distance between a classification of the altered image and the target classification, and
a similarity score to reduce a distance between the average filter activation difference and the measure for a difference in filter activations between the input image and the altered image.

16. A non-transitory computer readable medium on which is stored data representing instructions for altering an input image to provide an interpretability of a trained classifier, the instructions, when executed by a processor system, causing the processor system to perform the following steps:
accessing the trained classifier and the input image, the trained classifier including multiple filters;
applying the trained classifier to the input image to obtain a source classification;
obtaining an average filter activation difference including a measure for a difference in filter activations of a first set of images having the source classification and a second set of images having a target classification; and
determining an altered image for the input image, the determining of the altered image including optimizing at least:
a classification score of the altered image to reduce a distance between a classification of the altered image and the target classification, and
a similarity score to reduce a distance between the average filter activation difference and the measure for a difference in filter activations between the input image and the altered image.

* * * * *